(12) United States Patent
Gelbart

(10) Patent No.: US 6,430,136 B1
(45) Date of Patent: Aug. 6, 2002

(54) MULTIMODE MULTI-TRACK OPTICAL RECORDING SYSTEM

(75) Inventor: Daniel Gelbart, Vancouver (CA)

(73) Assignee: Creo Inc., Burnaby (CA)

( * ) Notice: Subject to any disclaimer, the term of this patent is extended or adjusted under 35 U.S.C. 154(b) by 0 days.

(21) Appl. No.: 09/710,123

(22) Filed: Nov. 7, 2000

(51) Int. Cl.$^7$ .............................. G11B 7/00
(52) U.S. Cl. .................... 369/112.01; 369/47.16; 369/44.14; 369/44.37
(58) Field of Search ................ 369/47.1, 47.11, 369/47.12, 47.15, 47.16, 47.19, 53.1, 53.11, 53.41, 53.45, 59.1, 59.12, 59.13, 112.01, 112.14, 116, 44.14, 44.37

(56) References Cited

U.S. PATENT DOCUMENTS

| | | | |
|---|---|---|---|
| 5,309,178 A | * | 5/1994 | Cross .................. 347/255 |
| 5,426,452 A | | 6/1995 | Davis |
| 5,475,416 A | | 12/1995 | Kessler |
| 5,517,359 A | | 5/1996 | Gelbart |
| 5,745,153 A | | 4/1998 | Kessler |
| 5,793,783 A | | 8/1998 | Endriz |
| 5,802,034 A | | 9/1998 | Gelbart |
| 5,831,659 A | | 11/1998 | Baek |
| 5,875,160 A | | 2/1999 | Harigaya |
| 5,923,475 A | | 7/1999 | Kurtz |
| 5,946,333 A | | 8/1999 | Kappeler |
| 5,995,475 A | | 11/1999 | Gelbart |
| 6,037,965 A | | 3/2000 | Gross |
| 6,064,528 A | | 5/2000 | Simpson |

* cited by examiner

*Primary Examiner*—Muhammad Edun
(74) *Attorney, Agent, or Firm*—Oyen Wiggs Green & Mutala

(57) ABSTRACT

A multimode laser diode stripe is imaged on a light valve, which separates the diode stripe image into a plurality of individually controllable channels. These channels are then imaged onto a recording media where they form a plurality of tracks. Introduction of astigmatism between the multimode laser diode and the light valve causes the laser diode stripe imaged on the light valve to be sharply focussed on its short axis, but less focussed on its elongated axis. This blurring of the stripe's elongated axis at the light valve overcomes near-field non-uniformity in the power distribution of the multimode diode, increasing the reliability and performance of the recording system.

26 Claims, 2 Drawing Sheets

MULTIMODE MULTI-TRACK OPTICAL RECORDING SYSTEM

FIELD OF THE INVENTION

The invention relates to multimode multi-track optical reading and recording using multimode laser diodes.

BACKGROUND OF THE INVENTION

Laser diodes are available as single mode or multimode diodes. Single mode laser diodes are effectively point sources and are diffraction limited in their divergence on all axes. In contrast, multimode diodes typically have laser junctions in the form of short stripes and are often referred to as "stripe" type laser diodes. Multimode laser diodes are diffraction limited in the direction perpendicular to the junction (their short axis), but have non-diffraction limited divergence in the parallel to the laser junction (their elongated axis).

The emitting aperture of a multimode diode can be a single or continuous stripe, a collection of short stripes or even a collection of single mode emitters electrically connected in parallel. In this application, the phrases "multimode diode" and "multimode laser diode" should be understood to incorporate each of these different diode constructions. In addition, laser diodes can emit radiation of various different frequencies and any reference to "light" in this application should be understood to incorporate any radiation frequency.

For recording applications, the principal advantage of using multimode laser diodes is that the radiation emitted from multimode diodes can be of substantially higher power than that emitted from single mode diodes. Obviously, higher power is a desirable quality for a recording operation, where heat or optical power alter the physical characteristics of the recording media. Despite this advantageous characteristic, a difficulty associated with multimode laser diodes is their non-uniform near-field power distribution. Not only is the near-field power distribution of a multimode diode non-uniform, but it typically changes with the age and usage of the diode. In an optical recording device, non-uniformity of the near-field power distribution can result in an unacceptable non-uniformity at the recording media, where the image is to be recorded. As a result, the image may be significantly degraded. This degradation may in turn lead to data loss or corruption. Therefore, most optical recording devices use single mode laser diodes, despite their relatively low power.

Accordingly, an apparatus and method are required to improve the performance of multimode laser optical recording devices. Such an improvement would overcome non-uniformity in the near-field power distribution of the multimode laser diode and faithfully record images on a recording media without banding, data loss or data corruption.

FIG. 1 depicts a prior art optical read/write head implemented using a light valve 3. Light from the laser diode source 9 is imaged via lens 10 into a line 12 on the light valve 3. The light valve 3 separates the light of the line 12 into a plurality of individually controllable component beams or "channels" (not shown). The individually controllable channels from the light valve 3 are imaged through polarizing beam splitter 4, quarter waveplate 5, and lens 6 onto the recording media 7. Lens 6 is typically an aspheric lens of high numerical aperture. An autofocus system (not shown) may be used to overcome the shallow depth of focus of the lens 6. The area 2 on the recording media 7 represents the image of the line 12 from the light valve 3. Within the area 2, the channels from the light valve 3 are imaged to form a plurality of tracks 11. Depending on the resolving power and/or data storage needs of the optical system, each parallel track 11 on the recording media 7 may comprise one or a plurality of channels.

During a write operation, the laser diode 9 is operated at high power and the individual channels from the light valve 3 are digitally controlled, so as to reproduce an image on the recording media 7. Typically, the recording media 7 and the optical recording system are moved or "scanned" relative to one another. The arrows on the recording media 7 of FIG. 1 indicate the scanning direction. While scanning, the data modulated into individual channels are controlled so as to record that data in the tracks 11 on the recording media 7.

In a read operation, the laser diode 9 is operated at low power (or a separate read diode is used). The light valve 3 causes the entire line 12 to be directed toward area 2 of the recording media 7 (i.e. the light valve is configured such that each of the channels are in an "on" state). The linearly polarized light from the laser diode 9 is converted to circular polarization by the quarter waveplate 5 before it impinges on the area 2 of the recording media 7. Depending on whether a particular track 11 within the area 2 has been recorded on or not, the intensity profile of the light reflected from the area 2 will vary. Upon reflection from the area 2, the beam is converted back to linear polarization by the waveplate 5, but the axis of polarization of the reflected beam is orthogonal to that of the incident beam. Consequently, when the reflected beam impinges on the polarizing beam splitter 4, it is reflected again onto detector array 8. Differences in the power distribution of the reflected beam at the detector array 8 allow the data in each track 11 of the recording surface 7 to be "read" electronically.

A multi-track optical recording system may incorporate "mark length" modulation, "mark width" modulation or both. These modulation schemes are explained in U.S. Pat. No. 5,802,034. U.S. Pat. No. 5,802,034 has the same inventor and assignee as the present invention and is hereby incorporated by reference.

Typically, multi-track optical recording systems use single mode laser diodes, because of the problems caused by the non-uniformity in the near-field power distribution of multimode lasers.

Accordingly, an apparatus and method are required to provide improved multi-track optical recording devices using multi-mode laser diodes. Such an improvement would overcome non-uniformity in the near-field power distribution of multimode laser diodes and faithfully record data and images on a recording media without banding, data loss or data corruption.

SUMMARY OF THE INVENTION

The present invention discloses an optical recording system, which comprises several elements. The recording apparatus includes a multi-channel light valve, a multimode radiation source having a short axis and an elongated axis and an optical subsystem with at least one optical element. The optical subsystem is operative to direct radiation from the radiation source to the light valve. Furthermore, the optical subsystem is anamorphic, introducing astigmatism, such that radiation directed from the radiation source onto the light valve is substantially focussed on the short axis and is less focussed on the elongated axis. The invention additionally comprises a recording medium, which may be permanently marked in response to incidence of imaging radiation from the light valve. Finally, an imaging assembly is located in an optical path between the light valve and the recording medium, and is operative to focus radiation from the light valve in such a manner to record permanent image marks on the recording medium.

Preferably, the radiation, which is incident on the light valve via the optical subsystem may be substantially uniform over its elongated axis.

Advantageously, the optical subsystem may comprise at least one cylindrical lens.

Preferably, the light valve may be made of either micromachined silicon or electro-optical material.

Preferably, the radiation source may be a multimode laser diode.

Advantageously, the optical recording system may be operative to simultaneously record a plurality of data tracks on the recording medium.

Another aspect of the present invention involves a similar optical recording system, wherein the optical subsystem is operative to direct radiation from the radiation source to the light valve and to substantially focus the radiation on the short axis, while ensuring that the radiation on the elongated axis is less focussed. Advantageously, this optical subsystem may comprise a cylindrical lens, a microlens array, a microprism array, or a grating.

Another aspect of the present invention involves a similar optical recording system, wherein the optical subsystem is operative to direct radiation from the radiation source to the light valve and to substantially focus the radiation on the short axis, while blurring the radiation on the elongated axis.

Another aspect of the present invention involves a method of reducing non-uniformity in a multimode optical recording system. The optical recording system utilizes a multi-channel light valve, which receives radiation from a multimode radiation source having a short axis and an elongated axis. The method comprises the step of introducing astigmatism between the radiation source and the light valve, such that the radiation received by the light valve is substantially focussed on the short axis and is less focussed on the elongated axis.

Another aspect of the present invention involves a similar method of reducing non-uniformity in a multimode optical recording system. It comprises the step of introducing at least one optical element between the radiation source and the light valve, such that the radiation received by the light valve is substantially focussed on the short axis and is less focussed on the elongated axis.

Another aspect of the present invention involves a similar method of reducing banding in a multimode optical recording system, which comprises the steps of:

(a) focussing an image of the short axis of the radiation source onto the light valve; and (b) causing an image of the elongated axis of the radiation source to be blurred on the light valve.

DESCRIPTION OF THE PREFERRED EMBODIMENT

Figure 1:
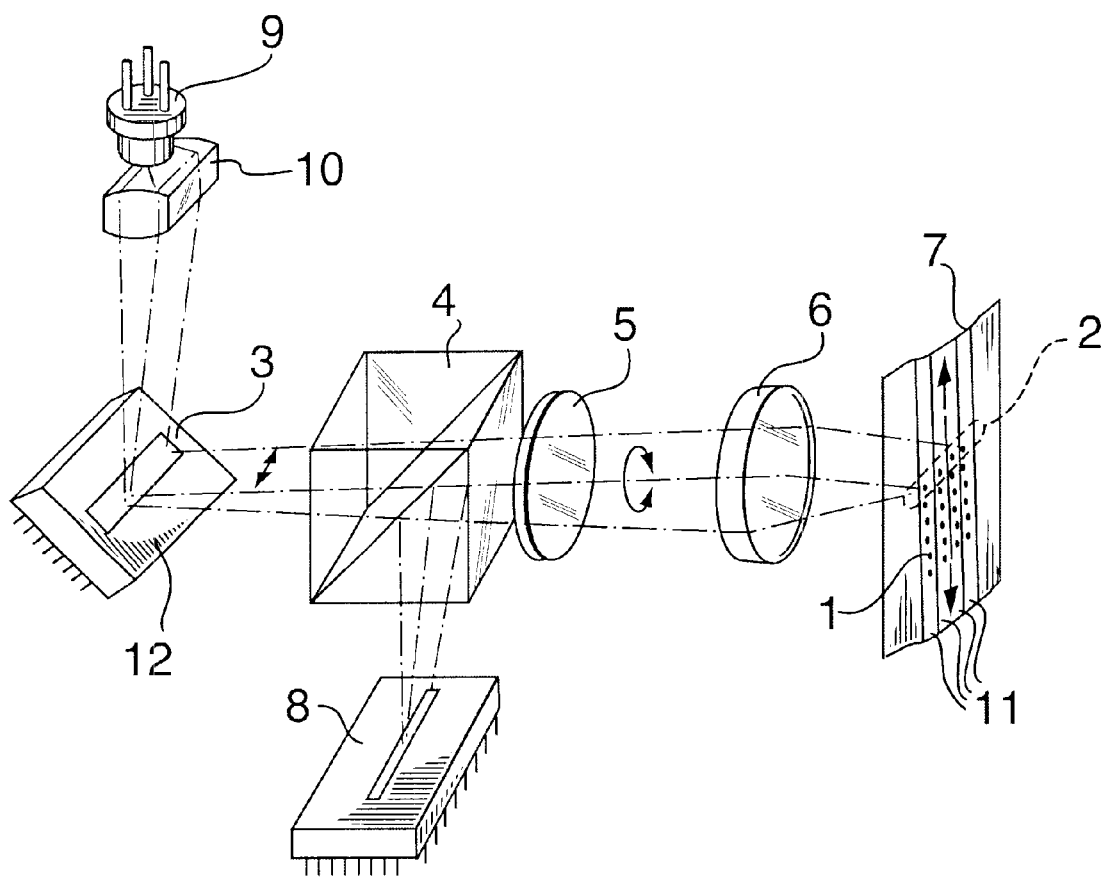
FIG. 1 depicts a typical prior art multi-track optical read/write apparatus.
Figure 2:
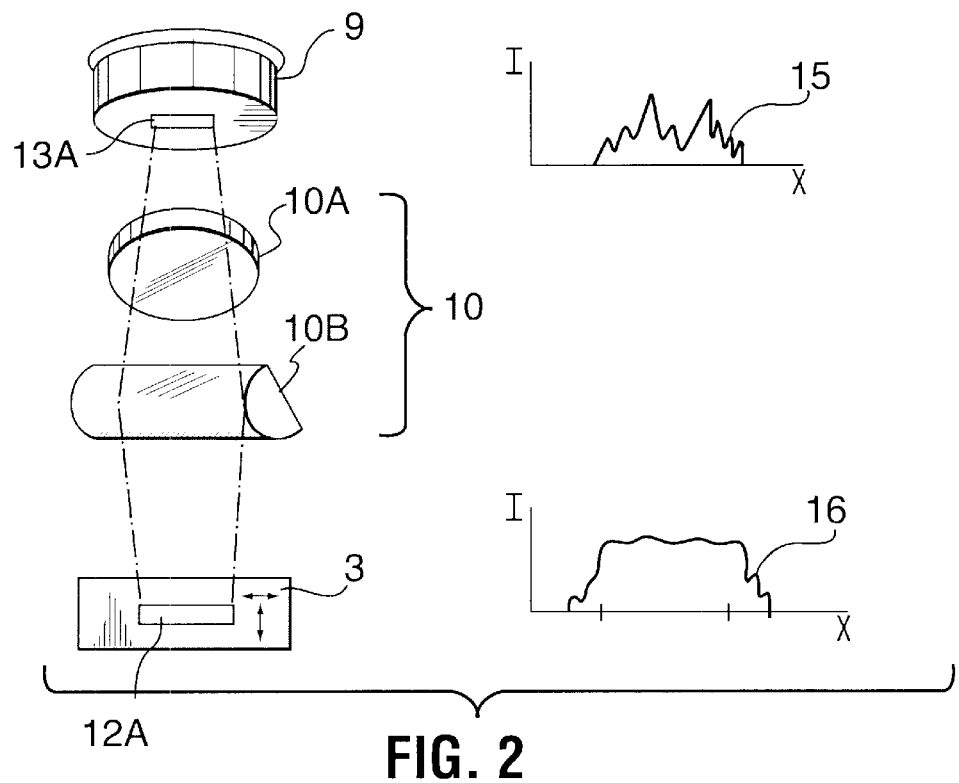
FIG. 2 depicts an embodiment of the present invention within a multimode multi-track optical recording apparatus, which involves the introduction of an astigmatic optical system.

The preferred embodiment of the present invention (depicted in FIG. 2) is inserted into a multi-track optical recording system such as the prior art system shown in FIG. 1. Referring to FIG. 2, a multimode laser diode 9 produces a "stripe" of light 13 corresponding to its emitting aperture. The rectangularly shaped light stripe 13, has a short axis and an elongated axis. The short axis of stripe 13 is perpendicular to the diode junction and is frequently referred to as the "fast axis", because light diverges more quickly on the short axis. Correspondingly, the elongated axis of stripe 13 is parallel to the diode junction and is referred to as the "slow axis", because light diverges less quickly on the elongated axis.

Plot 15 shows a typical intensity distribution of the light stripe 13 as it emerges from the multimode diode 9. The non-uniform distribution of the plot 15 reflects the non-uniformity of the multimode diode's power distribution in the near-field region.

The optical subsystem 10 is an anamorphic optical system. An anamorphic optical system is one which has different focal properties for different axes. The anamorphic optical subsystem 10 introduces astigmatism to the light emanating from the diode stripe 13, This astigmatism manifests itself when the diode stripe 13 is imaged as line 12 onto the light valve 3. In this application, the image 12 of the diode stripe 13 at the surface of the light valve 3 is referred to as the "diode stripe image". An example of an anamorphic optical subsystem is the combination of a spherical lens 10A and a cylindrical lens ion. In general, there are many implementations of anamorphic optics and the invention should be considered to incorporate any anamorphic optical system, which provides the optical characteristics explained below, In the present invention, light on the short axis of diode stripe 13 (i.e. the "fast axis") is focussed sharply onto the input surface of light valve 3. However, because of the astigmatism introduced by the anamorphic optical subsystem 10, light from the elongated axis of diode stripe 13 (i.e. the "slow axis") is not focussed sharply onto the light valve 3. Consequently, on the light valve 3, the elongated axis of the diode stripe image 12 is blurred. This blurring effect results in an altered light intensity distribution along the elongated axis of the diode stripe image 12. The blurring effect is similar to the overlapping of adjacent point sources. A typical intensity distribution of the diode stripe image 12 is depicted in plot 16. The plot 16 demonstrates how the astigmatism introduced by the anamorphic optical subsystem 10 blurs the elongated axis and substantially reduces the non-uniformity of the power distribution in the diode stripe image 12.

Using such an apparatus and method, the light received at the surface of the light valve 3 is relatively uniform and the drawbacks associated with the non-uniformity of the near-field power distribution are substantially reduced. Employing the present invention, an improved multimode multi-track optical recording system can be implemented, which takes advantage of high power multimode diodes without suffering from banding, data loss or data corruption on the recording media. For example, the prior art optical read/write head depicted in FIG. 1 may be improved by substituting the components of the present invention for its opening stage. That is, multimode diode 9 and anamorphic optical subsystem 10 of the FIG. 2 apparatus may replace single mode diode 9 and lens 10 of the FIG. 1 apparatus.

Other than astigmatism introduced by an anamorphic optical subsystem 10, several other methods may be used to blur the diode stripe image 12 on the surface of the light valve 3. One such implementation is depicted in FIG. 3.

Figure 3:
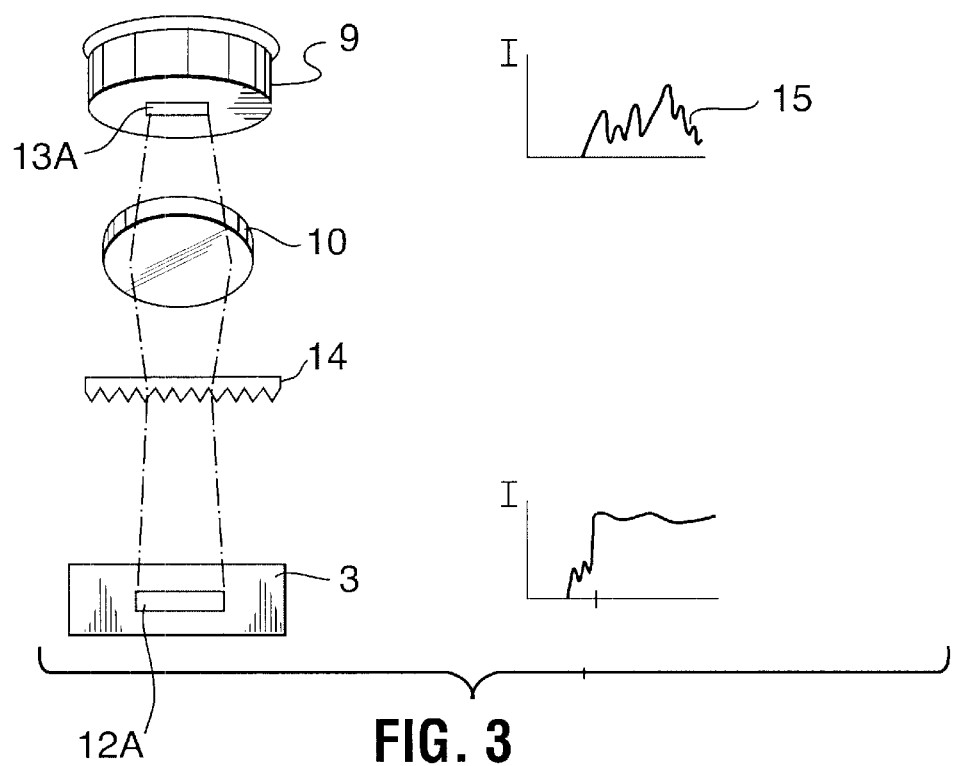
FIG. 3 depicts an alternative embodiment of the present invention within a multimode multi-track optical recording apparatus, which involves the introduction of a microprism array used to create a blurring effect.

Referring to FIG. 3, a multimode laser diode 9 produces a diode stripe 13, with the near-field intensity distribution 15. Light from the diode 9 is directed through lens 10 and then through microprism array 14, which is oriented parallel to the elongated axis of the diode stripe 13. Lens 10 focuses the light from the diode stripe 13 so as to form the diode stripe image 12 on the light valve 3.

Indeed, the short axis of the diode stripe image 12 is sharply focussed. On the elongated axis, however, the microprism array 14 causes refraction of the light, which blurs the laser diode stripe image 12 along its elongated axis. This blurring of the laser diode stripe image 12 along its elongated axis results in the power distribution depicted in plot 16. The plot 16 indicates how the use of the microprism array 14 blurs the elongated axis and substantially reduces the non-uniformity of the power distribution in the diode stripe image 12.

As with the astigmatism technique, the use of a microprism array 14 to blur the elongated axis of the diode stripe image 12 may be implemented in any multi-track optical recording system, such as the one depicted in FIG. 1.

A blurring such as the one caused by microprism array 14 can be effected by a number of other optical elements, such as a microlens array and a grating. In general, the present invention should be understood to include the introduction of any optical subsystem into an optical recording system, where light from a multimode laser diode is focused onto a light valve and (because of the newly introduced optical subsystem) that focus is caused to be sharp along the short axis of the diode stripe image and blurred along its elongated axis.

It should be understood that the above description is intended for illustrative purposes only, and is not intended to limit the scope of the present invention in any way. Those skilled in the art will appreciate that various modifications can be made to the embodiments discussed above without departing from the spirit of the present invention.

What is claimed is:

1. An optical recording apparatus comprising:
   (a) a multi-channel light valve;
   (b) a radiation source having a short axis and an elongated axis;
   (c) an optical subsystem comprising at least one optical element, operative to direct radiation from said radiation source to said light valve;
   (d) a recording medium, which is sensitive to imaging radiation and capable of being permanently marked in response to incidence of such imaging radiation; and
   (e) an imaging assembly located in an optical path between said light valve and said recording medium, which is operative to focus radiation from said light valve onto said recording medium so as to record permanent image marks thereon;
   wherein said light valve comprises a micromachined silicon light valve or an electro-optical light valve and said optical subsystem is anamorphic and introduces astigmatism, such that radiation directed from said radiation source onto said light valve is substantially focussed on the short axis and is less focussed on the elongated axis.

2. An apparatus according to claim 1, wherein said radiation incident on said light valve via said optical subsystem is substantially uniform over its elongated axis.

3. An apparatus according to claim 1, wherein said optical subsystem comprises at least one cylindrical lens.

4. An apparatus according to claim 1, wherein said radiation source is a multimode laser diode.

5. An apparatus according to claim 1, wherein said optical recording system is operative to simultaneously record a plurality of data tracks on said recording medium.

6. An apparatus according to claim 1, wherein said optical subsystem comprises one of: a grating; a microlens array; and a microprism array.

7. An optical recording apparatus comprising:
   (a) a multi-channel light valve;
   (b) a radiation source having a short axis and an elongated axis;
   (c) an optical subsystem comprising at least one optical element, operative to direct radiation from said radiation source to said light valve;
   (d) a recording medium, which is sensitive to imaging radiation and capable of being permanently marked in response to incidence of such imaging radiation; and
   (e) an imaging assembly located in an optical path between said light valve and said recording medium, which is operative to focus radiation from said light valve onto said recording medium so as to record permanent image marks thereon;
   wherein said light valve comprises a micromachined silicon light valve or an electro-optical light valve and said radiation directed from said radiation source onto said light valve is substantially focussed on the short axis and is less focussed on the elongated axis.

8. An apparatus according to claim 7, wherein said radiation incident on said light valve via said optical subsystem is substantially uniform over its elongated axis.

9. An apparatus according to claim 7, wherein said radiation source is a multimode laser diode.

10. An apparatus according to claim 7, wherein said optical recording system is operative to simultaneously record a plurality of data tracks on said recording medium.

11. An apparatus according to claim 7, wherein said optical subsystem comprises one of: a cylindrical lens; a microlens array; a microprism array; and a grating.

12. An optical recording system comprising:
    (a) a multi-channel light valve;
    (b) a radiation source having a short axis and an elongated axis;
    (c) an optical subsystem comprising at least one optical element, operative to direct radiation from said radiation source to said light valve;
    (d) a recording medium, which is sensitive to imaging radiation and capable of being permanently marked in response to incidence of such imaging radiation; and
    (e) an imaging assembly located in an optical path between said light valve and said recording medium, which is operative to focus radiation from said light valve onto said recording medium so as to record permanent image marks thereon; wherein said radiation directed from said radiation source onto said light valve is substantially focussed on the short axis and is less focussed on the elongated axis and wherein said optical subsystem comprises one of:
    (i) a cylindrical lens;
    (ii) a microlens array;
    (iii) a microprism array; and
    (iv) a grating.

13. An optical recording system according to claim 12, wherein said light valve is made of one of:
   (a) micromachined silicon; and
   (b) electro-optical material.

14. An optical recording system according to claim 12, wherein said radiation incident on said light valve via said optical subsystem is substantially uniform over its elongated axis.

15. An optical recording system according to claim 17, wherein said radiation source comprises a multimode laser diode.

16. An optical recording system according to claim 12, wherein said optical recording system is operative to simultaneously record a plurality of data tracks on said recording medium.

17. An optical recording apparatus comprising:
   (a) a multi-channel light valve;
   (b) a multimode radiation source having a short axis and an elongated axis;
   (c) an optical subsystem comprising at least one optical element, operative to direct radiation from said radiation source to said light valve;
   (d) a recording medium, which is sensitive to imaging radiation and capable of being permanently marked in response to incidence of such imaging radiation; and
   (e) an imaging assembly located in an optical path between said light valve and said recording medium, which is operative to focus radiation from said light valve onto said recording medium so as to record permanent image marks thereon;
      wherein said light valve comprises a micromachined silicon light valve or an electro-optical light valve and said radiation directed from said radiation source onto said light valve is substantially focussed on the short axis and is blurred on the elongated axis.

18. An apparatus according to claim 17, wherein said radiation incident on said light valve via said optical subsystem is substantially uniform over its elongated axis.

19. A method of increasing uniformity in a multimode optical recording system utilizing a multi-channel light valve, which light valve comprises a micromachined silicon light valve or an electro-optical light valve which receives radiation from a multimode radiation source having a short axis and an elongated axis, the method comprising introducing astigmatism between said radiation source and said light valve, such that said radiation received by said light valve is substantially focussed on said short axis and is less focussed on said elongated axis.

20. A method according to claim 19, wherein said radiation received by said light valve is substantially uniform over its elongated axis.

21. A method of increasing uniformity in a multimode optical recording system utilizing a multi-channel light valve, which light valve comprises a micromachined silicon light valve or an electro-optical light valve which receives radiation from a multimode radiation source having a short axis and an elongated axis, the method comprising:
   introducing at least one anamorphic optical element between said radiation source and said light valve, such that said radiation received by said light valve is substantially focussed on said short axis and is less focussed on said elongated axis.

22. A method according to claim 21, wherein said radiation received by said light valve is substantially uniform over its elongated axis.

23. A method of increasing uniformity in a multimode optical recording system utilizing a multi-channel light valve, which light valve comprises a micromachined silicon light valve or an electro-optical light valve which receives radiation from a multimode radiation source having a short axis and an elongated axis, the method comprising;
   (a) focusing an image of said short axis of said radiation source onto said light valve; and
   (b) causing an image of said elongated axis of said radiation source to be blurred on said light valve.

24. An optical recording apparatus comprising:
   a multi-channel light valve comprising a plurality of optical elements, which elements are one of: micromachined silicon and electro-optical material;
   a radiation source configured to emit a beam of radiation having a short axis and an elongated axis;
   an anamorphic optical subsystem comprising at least one optical element, said optical subsystem configured to direct radiation from said radiation source onto said light valve such that the radiation directed onto said light valve is substantially focussed on its short axis and is less focussed on its elongated axis; and,
   imaging optics configured to receive radiation from said light valve and focus it onto a recording medium so as to record data thereon.

25. An optical read/write unit comprising:
   a multi-channel light valve;
   a radiation source configured to emit a beam of radiation having a short axis and an elongated axis, the radiation source capable of operation in a higher-intensity write mode and a lower-intensity read mode;
   an anamorphic optical subsystem comprising at least one optical element, said optical subsystem configured to direct radiation from said radiation source onto said light valve such that the radiation directed onto said light valve is substantially focussed on its short axis and is less focussed on its elongated axis;
   an imaging assembly operative to receive radiation from said light valve and to focus it onto a recording medium, such that when said radiation source operates in the write mode, the radiation focussed onto said recording medium records data onto said recording medium and when said radiation source operates in the read mode, the radiation focussed onto said recording medium reflects from a surface of said recording medium; and,
   a radiation sensor operative to receive radiation that is reflected from said recording medium when said radiation source is in the read mode.

26. An optical read/write unit comprising:
   a multi-channel light valve;
   a writing radiation source having a short axis and an elongated axis;
   an anamorphic optical subsystem comprising at least one optical element, said optical subsystem configured to direct said writing radiation from said radiation source onto said light valve such that the radiation directed onto said light valve is substantially focussed on its short axis and is less focussed on its elongated axis;
   a reading radiation source;
   an imaging optical assembly operative to focus writing radiation from said light valve onto a recording medium in such a manner that the focussed writing radiation records data onto said recording medium;
   a radiation sensor operative to receive reading radiation reflected from said recording medium.

* * * * *

UNITED STATES PATENT AND TRADEMARK OFFICE
CERTIFICATE OF CORRECTION

| | | |
|---|---|---|
| PATENT NO. | : 6,430,136 B1 | Page 1 of 1 |
| DATED | : August 6, 2002 | |
| INVENTOR(S) | : Jang-Hoon Yoo et al. | |

It is certified that error appears in the above-identified patent and that said Letters Patent is hereby corrected as shown below:

Title page,
Item [56], U.S. PATENT DOCUMENTS, add -- 2,656,761    10/27/1953    B.S. Blaisse --
Add -- FOREIGN PATENT DOCUMENTS
99/27532    03/1999    WIPO
0762403     03/1997    Europe
0910074     04/1999    Europe
0373700     06/1990    Europe
0918321     05/1999    Europe
3119498     12/1985    Germany
6214154     05/1994    Japan --
Add -- OTHER PUBLICATIONS
T. Narahara et al., "Optical Disc System for Digital Video Production." Vol. 39, No. 2b, Part 1, Jpn. J. Appl. Phys., pp. 912-919 (Feb. 2000). --

Signed and Sealed this

Twenty-eighth Day of October, 2003

JAMES E. ROGAN
*Director of the United States Patent and Trademark Office*